(12) United States Patent
Moore et al.

(10) Patent No.: US 7,871,045 B2
(45) Date of Patent: Jan. 18, 2011

(54) METHOD AND SYSTEM FOR BRACING PIPES

(75) Inventors: Kevin S. Moore, Pleasant Hill, CA (US); Evan M. Reis, Menlo Park, CA (US)

(73) Assignee: Certus Consulting, Inc., Oakland, CA (US)

( * ) Notice: Subject to any disclaimer, the term of this patent is extended or adjusted under 35 U.S.C. 154(b) by 267 days.

(21) Appl. No.: 11/954,128

(22) Filed: Dec. 11, 2007

(65) Prior Publication Data

US 2009/0146020 A1 Jun. 11, 2009

(51) Int. Cl.
*E21F 17/02* (2006.01)
(52) U.S. Cl. .................. 248/62; 248/68.1; 248/188.1; 248/317; 52/126.6; 52/263
(58) Field of Classification Search .................. 248/62, 248/58, 68.1, 72, 317, 188.1, 200.1, 295.11; 52/220.5, 220.1, 126.6, 220.2, 263
See application file for complete search history.

(56) References Cited

U.S. PATENT DOCUMENTS

| | | | |
|---|---|---|---|
| 2,846,169 A | 8/1958 | Sullivan | |
| 2,880,949 A * | 4/1959 | Fuss | 248/70 |
| 3,787,016 A * | 1/1974 | Laval, Jr. | 248/49 |
| 3,866,871 A | 2/1975 | Dupuy, Sr. | |
| 4,044,428 A | 8/1977 | Kowalski | |
| 4,065,218 A | 12/1977 | Biggane | |
| 4,442,989 A * | 4/1984 | Hartmann | 248/49 |
| 4,793,580 A * | 12/1988 | Richards | 248/188 |
| 4,934,650 A | 6/1990 | LeKuch et al. | |
| 4,960,253 A * | 10/1990 | Perrault et al. | 248/68.1 |
| 5,044,303 A * | 9/1991 | Culver, Jr. | 116/209 |
| 5,310,152 A | 5/1994 | O'Neill | |
| 5,320,439 A * | 6/1994 | Perrault et al. | 403/379.1 |
| 5,428,936 A * | 7/1995 | Roth | 52/704 |
| 5,548,932 A * | 8/1996 | Mead | 52/126.6 |
| 5,573,210 A | 11/1996 | Hendrix et al. | |
| 5,713,157 A * | 2/1998 | van Leeuwen et al. | 52/39 |
| 6,061,984 A * | 5/2000 | Rose | 52/220.1 |
| 6,293,056 B1 | 9/2001 | He | |
| 6,708,930 B2 | 3/2004 | Heath | |
| 7,168,212 B2 * | 1/2007 | Jette | 52/220.5 |

* cited by examiner

*Primary Examiner*—Anita M King
(74) *Attorney, Agent, or Firm*—Mintz, Levin, Cohn, Ferris, Glovsky and Popeo, P.C.

(57) ABSTRACT

A method and system for bracing pipe, conduit and ductwork, which includes a mounting plate attachable to an underside of a structural flooring member, an elongated support member attachable to an underside of the mounting plate, and at least one elongated channel member. The at least one elongated channel member attaches to a side of the elongated support member, wherein the at least one elongated channel member is adapted to receive a fastener for attaching at least one conduit member to the elongated channel member.

17 Claims, 11 Drawing Sheets

SECTION A-A

SCHEDULE

| POST | TUBE | t | PLATE b x d | # BOLTS | STIFF PL. | SHEATHE |
|---|---|---|---|---|---|---|
| ST50 | HSS3x3x3/16 | 1/4 | 15"x15"x1/2" | 4 | NONE | HSS4X4X1/4 |
| ST100 | HSS4x4x1/4 | 5/16 | 15"x15"x1/2" | 4 | NONE | HSS4.5x4.5x1/4 |
| ST150A | HSS4x4x5/16 | 5/16 | 27"x19"x5/8" | 4 | NONE | HSS5X5X1/2 |
| ST150B | HSS4x4x5/16 | 5/16 | 15"x21"x5/8" | 6 | 3/4"PL 2"X6" | HSS5X5X1/2 |
| ST200 | HSS5x5x1/4 | 5/16 | 27"x21"x3/4" | 6 | 3/4"PL 2"X9" | HSS6X6X1/2 |

FIG. 9

METHOD AND SYSTEM FOR BRACING PIPES

FIELD OF THE INVENTION

The invention generally relates to a method and system for bracing pipe and conduit, and more particularly to a method and system for bracing pipe and conduit, which significantly reduces the footprint of a typical pipe and conduit bracing system by use of an elongated support member and at least one elongated member adapted to receive a fastener or fasteners for attaching at least one pipe or conduit member to the elongated channel member.

BACKGROUND OF THE INVENTION

Pipe and conduit bracing is typically employed in buildings (e.g., hospitals, labs, offices, etc.) to support the weight of the pipes, conduits and their contents. Pipe and conduit bracing systems also prevent excessive lateral movement under earthquake loading. As shown in FIGS. 1 and 2, traditional bracing methods, which generally comprise about 95% of the market, typically consist of a steel rod hung vertically from the underside of a building structure to support the weight of the pipe or conduit and at least one diagonal bracing element that attaches to the pipe or conduit and to the underside of the building structure to resist lateral forces. A diagonal bracing element is typically placed in each orthogonal direction to prevent movement parallel and perpendicular to the pipe.

One of the primary deficiencies with the traditional bracing method is the need for at least two components to achieve a bracing system for a single pipe. The labor involved in installing these bracing systems can be considerable since the attachments of the diagonal braces to the building structure above are often some horizontal distance away from the pipe itself. It can be appreciated that these bracing systems can also introduce conflict with other pipes, ducts, conduit, structural framing or partition walls. In addition, traditional pipe and conduit bracing systems can introduce significant congestion into crowded runs of pipes and conduit, thereby necessitating close coordination between designer and constructer during installation. Traditional pipe and conduit bracing systems can also present challenges for retrofit construction where access is tightly controlled because of the need to maintain clean environments, such as in hospitals or labs. For example, many plenum spaces present tall spaces that necessitate long distances between pipe or conduit location and brace to building structure connection. In those cases, a large clean environment must be established to execute the installation of the bracing system.

Accordingly, it is desirable to employ a method and system of bracing pipes, which significantly reduces the footprint of element connections, reduces the number of bracing elements, reduces installation time and provides a more robust design that can accommodate field changes.

SUMMARY OF THE INVENTION

In accordance with one embodiment, a bracing assembly comprises: a mounting plate attachable to the underside of a structural member; an elongated support member attachable to the underside of the mounting plate, the elongated support member being substantially rectangular in cross-section; and at least one elongated channel member attachable to a side of the elongated support member, and wherein at least one elongated channel member is adapted to receive a fastener or fasteners for attaching at least one pipe or conduit member to the elongated channel member.

In accordance with another embodiment, a system for bracing pipes or conduit comprises: a plurality of bracing assemblies, each of the bracing assemblies comprising: a mounting plate attachable to the underside of a structural member; an elongated support member attachable to the underside of the mounting plate, the elongated support member being substantially rectangular in cross-section; and at least one elongated channel member attachable to at least one side of the elongated support member; and a fastener or fasteners for attaching pipes to the elongated channel member; and a plurality of pipes or conduit, and wherein each of the plurality of pipes and conduit is attached to at least one bracing assembly.

In accordance with a further embodiment, a method for bracing a plurality of pipes and conduit, the method comprises: attaching a pipe bracing assembly to the underside of a structural member, the pipe bracing assembly comprising: a mounting plate attachable to the underside of the structural member; an elongated support member attachable to the underside of the mounting plate, the elongated support member being substantially rectangular in cross-section; and at least one elongated channel member attachable to a side of the elongated support member, wherein at least one elongated channel member is adapted to receive a fastener or fasteners for attaching at least one pipe or conduit to the elongated channel member; and attaching at least one pipe or conduit to at least one elongated channel member.

BRIEF DESCRIPTION OF THE DRAWINGS

FIG. 9 is a schedule of different embodiments of the pipe bracing assembly as shown in FIG. 3.

DETAILED DESCRIPTION

It would be desirable to have a method and system of bracing pipes and conduit, which significantly reduces the footprint of a typical pipe and conduit bracing assembly, and provides a more robust design that can accommodate field changes. In accordance with one embodiment, the method and system provides a pipe and conduit bracing system in which several pipes and conduit can be attached to a single support member or assembly 10. Unlike traditional pipe and conduit bracing that typically requires three separate bracing elements for each individual pipe or conduit, in accordance with one embodiment, the method and system allows for the bracing of a plurality of pipes or conduit from a single support member or assembly 10. In addition, the pipe bracing assembly 10 can also support a plurality of pipes, conduits and/or ductwork against gravity loads and lateral forces imparted by an earthquake or similar motion.

Figure 1:
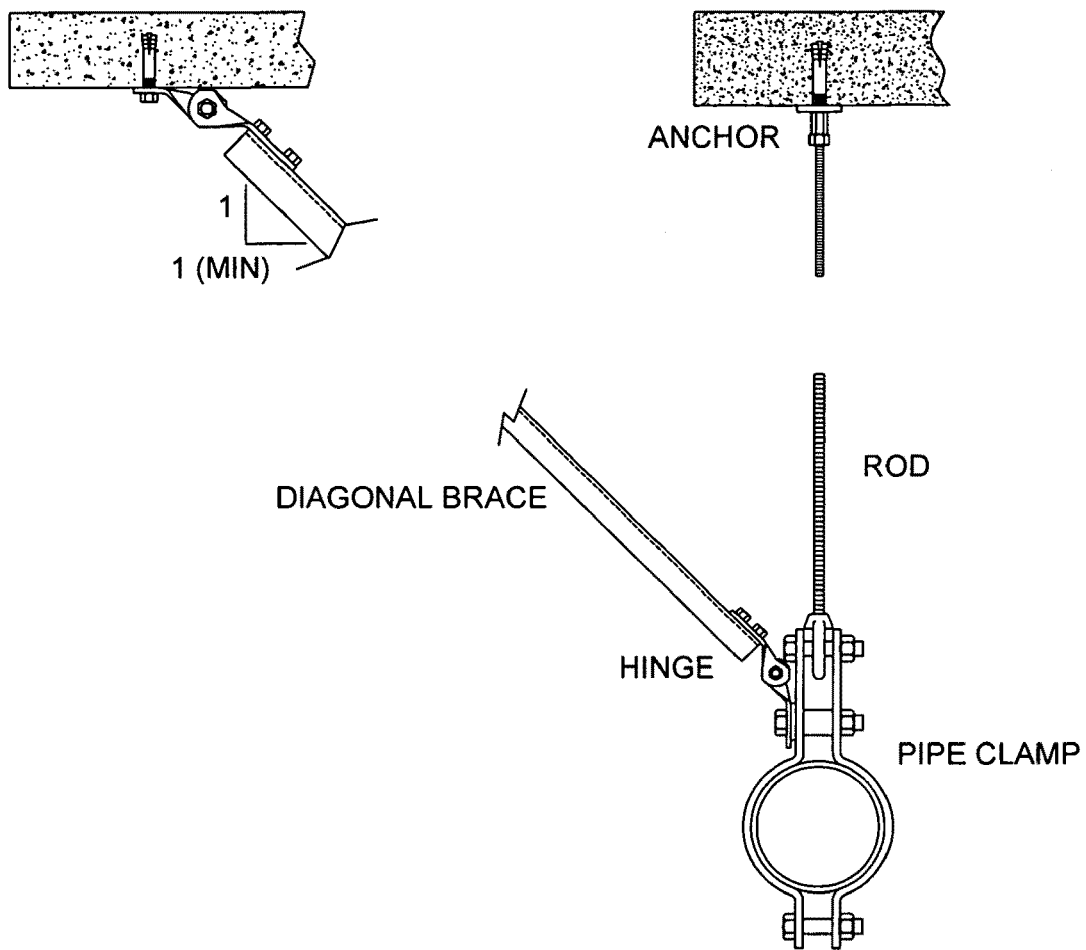
FIG. 1 is a plan view of a traditional pipe bracing system perpendicular to a pipe run.
Figure 2:
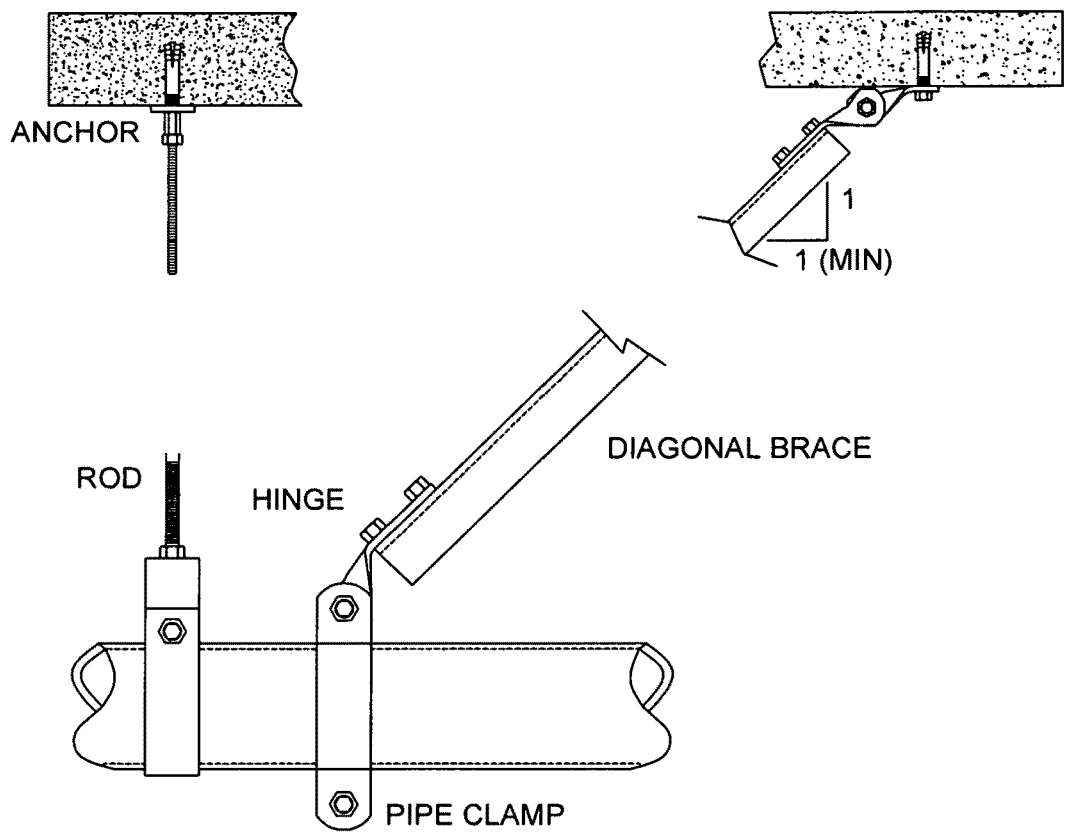
FIG. 2 is a plan view of a traditional pipe bracing system parallel to a pipe run.
Figure 3:
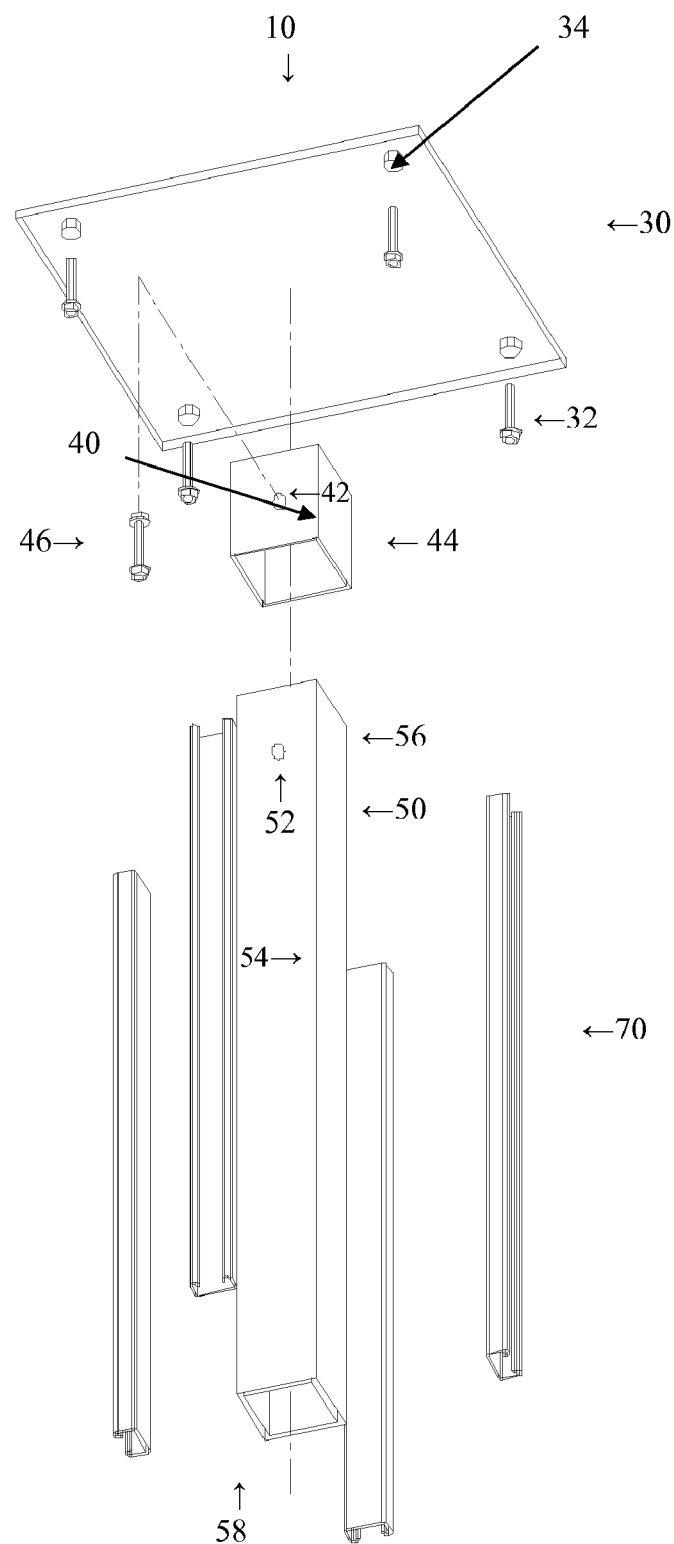
FIG. 3 is an exploded perspective view of a pipe bracing assembly in accordance with one embodiment.

As shown in FIG. 3, the assembly 10 includes a mounting plate 30 attachable to an underside of a structural flooring member 110 (FIG. 5), and an elongated support member (i.e., a support tube) 50 attachable to an underside of the mounting plate 30. In accordance with an embodiment, the elongated support member 50 is preferably a hollow tubular member having a polygonal cross-section, and more preferably a rectangular cross-section. At least one elongated channel member 70 is attached to a side of the elongated support member 50. The at least one elongated channel member 70 is adapted to receive a fastener 100 for attaching at least one pipe or conduit member 90 to the elongated channel member 70.

In accordance with one embodiment, the pipe bracing assembly 10 is essentially three separate units comprising the mounting plate 30, the elongated support member 50 and the elongated channel member 70. In accordance with one embodiment, each unit (i.e., the mounting plate 30, the elongated support member 50, and the elongated channel member 70) is pre-manufactured or pre-fabricated and delivered to the field for installation.

The mounting plate 30 is preferably a rectangular steel plate of varying size and thickness. Although the mounting plate 30 is preferably comprised of a steel or steel-like material, it can be appreciated that other suitable materials can be used including shape memory alloys (Ni—Ti, Cu—Al—Zn etc.), carbon fiber reinforced materials, heavy-duty advanced plastics and resins, and/or other metal alloys. In accordance with one embodiment, the mounting plate 30 is bolted to an underside of a structural floor or a structural flooring member 110 (FIG. 5) with a plurality of bolts or anchors 32. In accordance with one embodiment, a high strength bolt 32 can be used to attach the mounting plate 30 to the underside of the structural flooring member 110. The high strength bolt 32 is preferably a single bolt having a diameter of about ½ inch (0.5 inches) to about 1 and ½ inches (1.5 inches) and more preferably a single ¾-inch (0.75 inch) diameter bolt. The structural flooring member 110 can be a metal deck with a concrete topping, a concrete flat slab, a concrete waffle slab, or a concrete beam. In an alternative embodiment, the mounting plate 30 can be welded or bolted using brackets and other constructions to a lower or bottom flange of a steel beam.

In accordance with one embodiment, the elongated support member 50 can be attached to the mounting plate 30 via a sheath or sheathing member 40. The mounting plate is welded to an upper portion of the sheath or sheathing member (i.e., a square steel tube) 40. The sheath or sheathing member 40 is preferably about 2 to 24 inches in length and more preferably about eight (8) inches long with at least one opening or hole 42 in one of the sides 44 of the sheathe or sheathing member 40. The elongated support member 50 has at least one hole 52 in one of the sides 54 of the elongated support member 50 near an upper portion 56 thereof, which matches the at least one hole 42 in the sheath or sheathing member 40. In accordance with one embodiment, the hole 52 in the elongated support member 50 is field drilled using the hole 42 in the sheath or sheathing member 40. In accordance with a preferred embodiment, a single bolt 46 is used to attach or fix the sheath or sheathing member 40 and the elongated support member 50 to one another. However, it can be appreciated that both the sheath or sheathing member 40 and the elongated support member 50 can have more than one hole 42, 52, such that the sheath or sheathing member 40 and the elongated support member 50 can be attached or fixed to one another with a plurality of bolts 46.

The elongated support member 50 preferably has a substantially rectangular cross-section and is more preferably a square steel tube of varying length and dimension. In accordance with one embodiment, the elongated support member 50 can be about 2 to 8 feet long and about 2 to 12 inches in width and more preferably about 4 to 6 feet long and about 3 to 5 inches in width. Although the elongated support member 50 and elongated channel member 70 are preferably comprised of a steel or steel-like material, it can be appreciated that other suitable materials can include shape memory alloys (Ni—Ti, Cu—Al—Zn etc.), carbon fiber reinforced materials, heavy-duty advanced plastics and resins, and/or other metal alloys.

The elongated channel member 70 can be a UNISTRUT®, or similar product, which is a continuous channel, typically made of cold-rolled steel, that has a substantially U-shaped cross-section and is often used to attach and brace pipes. In accordance with one embodiment, the elongated channel member 70 has a substantially U-shaped cross-section and a vertical channel extending along the length thereof. The elongated channel member 70 preferably extends from about 12 inches from a top portion 56 of the elongated support member 50 to a bottom portion 58 of the elongated support member 50. The elongated channel member 70 can be welded to the elongated support member 50, or alternatively fixed or attached to the elongated support member 50 via any suitable fastener such as an anchor, a bolt or a clamp.

Figure 4:
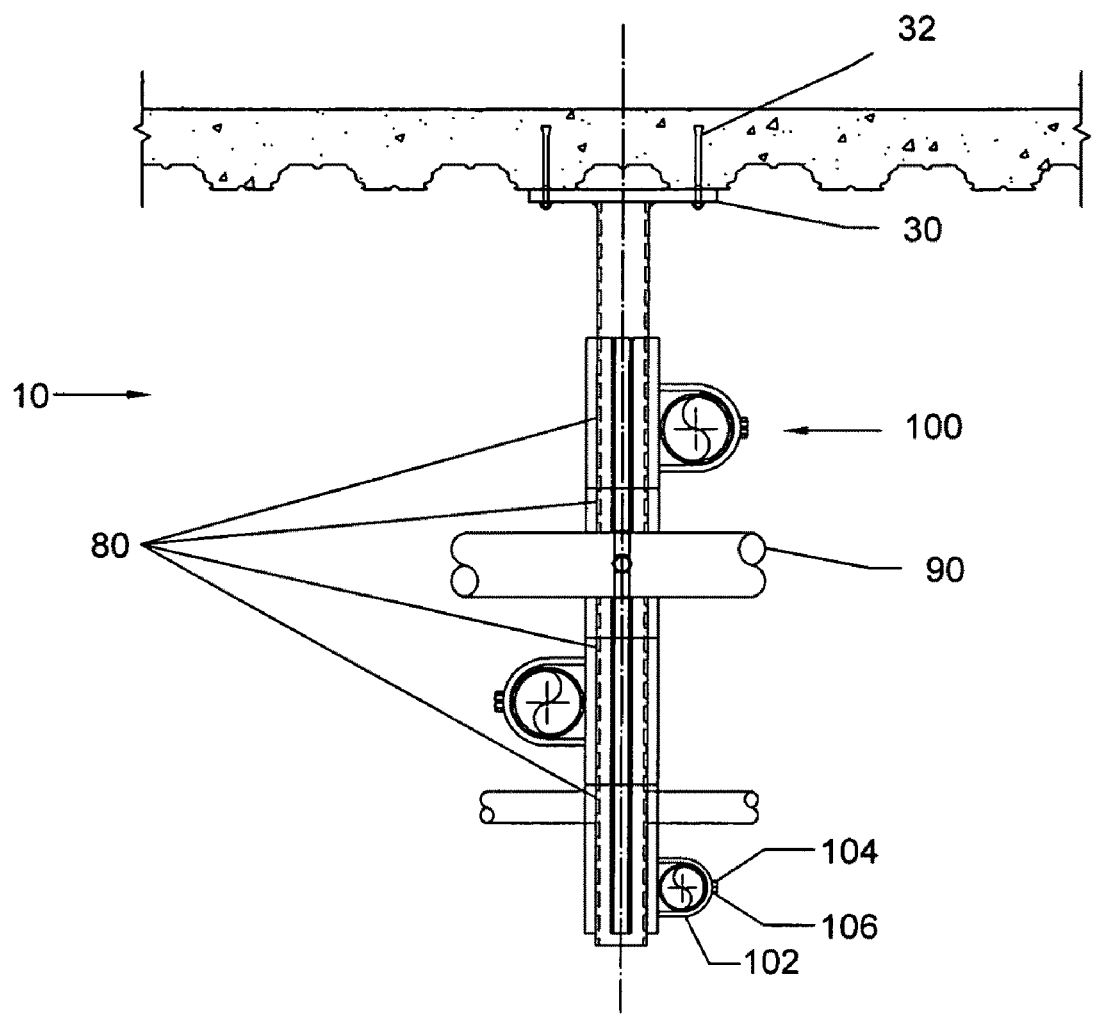
FIG. 4 is a perspective view of a color-coded pipe bracing assembly in accordance with another embodiment.

FIG. 4 shows an alternative embodiment of the pipe assembly 10, wherein the mounting plate 30 is welded directly to the elongated support member 50 without the sheathing member 40 or anchoring assembly or bolts 42. As shown in FIG. 4, a single bracing assembly 10 can receive at least one pipe or conduit 90 and more preferably a plurality of pipes or conduits 90, which are attached to one or more sides of the elongated support member 50 via the elongated channel members 70. It can be appreciated that the pipes or conduits 90 can be of different size and shape, and further almost any type of pipe or conduit 90 can be attached to the elongated channel member 70 with a suitable fastener 100, such as a clamp or bracket. In accordance with one embodiment, the fastener 100 is a clamp or bracket comprised of a pair of strapping elements 102 preferably of metal, steel, etc., which are bolted together with a screw threaded bolt 104 and nut 106. Each strapping element 102 can have a notched recess on either side of its lower end portion adapted to be received within the curled flange portion of elongated channel member 70.

In a preferred embodiment, as shown in FIG. 4, the elongated support member 50 and the elongated channel member 70 has a series of colored bands or markings 80, which provide the contractor or conduit/piping installer with a guide for the placement of the conduit or pipes. For example, the farther down the elongated support member 50 a pipe or conduit 90 is placed, the higher the stresses that are introduced into the elements under earthquake forces. The colored bands or markings 80 can also assist the contractor or installer with the installation of the various pipes and/or conduit by providing a method of quickly identifying acceptable locations, whether based on load requirements, and/or type and/or use of each of the individual pipes or conduit 90.

Figure 5:
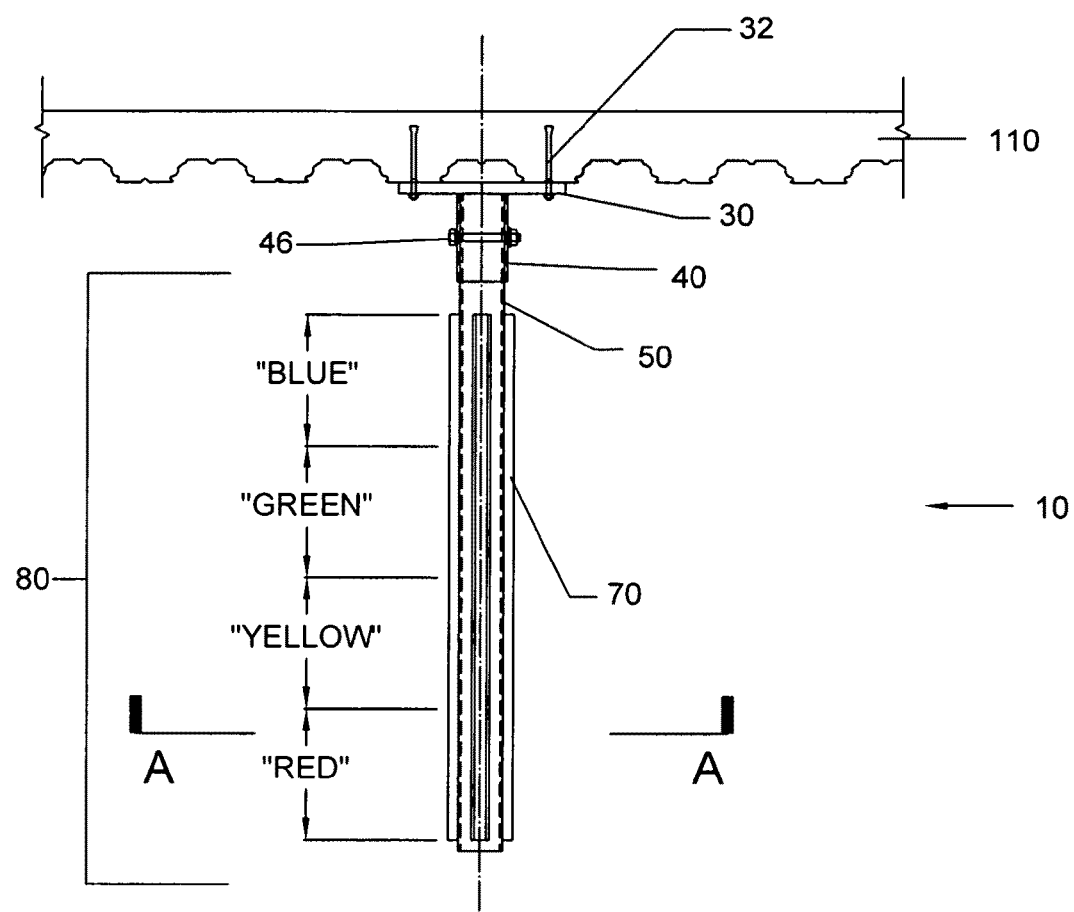
FIG. 5 is a plan view of a pipe bracing assembly in accordance with a further embodiment.

FIG. 5 shows a detailed drawing of the bracing assembly 10 in accordance with one embodiment. As shown in FIG. 5, the assembly 10 includes the mounting plate 30, the elongated support member 50 and at least one channel member 70, which is attached to the underside of a structural flooring member 110. The mounting plate 30 is preferably fixed or attached to the underside of the structural flooring member 110 with at least one bolt 32. In accordance with one embodiment, a sheath or sheathing member 40 can be used to attach the elongated support member 50 to the mounting plate 30. The elongated support member 50 preferably includes a series of colored bands or markings 80, wherein the colored bands or markings 80 include a color-coded system such as blue, green, yellow or red, wherein each band can correspond to a particular type of conduit or pipe 90 and/or use.

As shown in FIG. 5, in accordance with a preferred embodiment, the elongated support member 50 can be inserted inside a sheath or sheathing member 40, which is attached or fixed at an upper end to the underside of the mounting plate 30 and configured to receive the support member 50. In accordance with one embodiment, the support member 50 and the sheathing member 40 are preferably coupled or attached to one another with a suitable fastener and more preferably attached to one another with a ¾-inch (0.75 inch) bolt using a drilled hole in each of the two members 40, 50.

Figure 6:
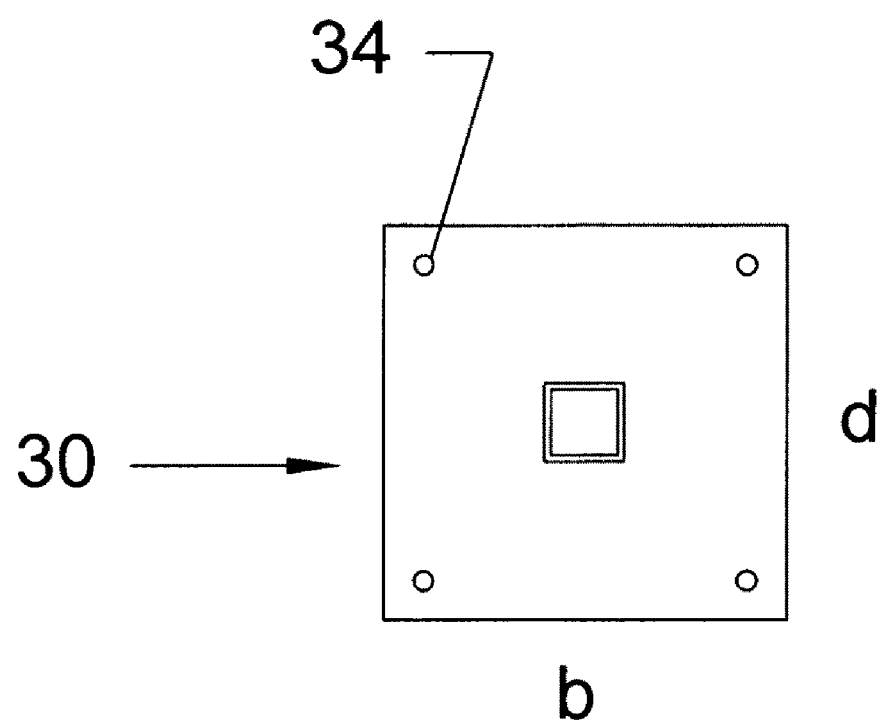
FIG. 6 is a cross-sectional plan view of a mounting plate in accordance with one embodiment.
Figure 7:
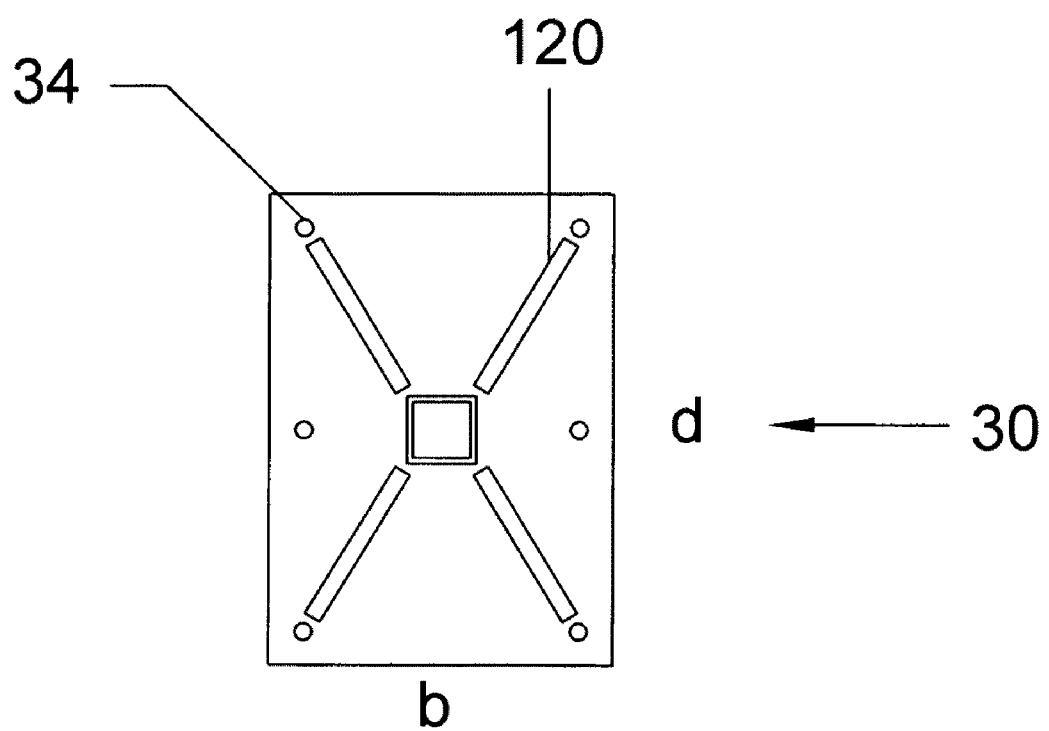
FIG. 7 is a cross-sectional plan view of a mounting plate in accordance with another embodiment.

In accordance with one embodiment, the mounting plate 30 is preferably a rectangular plate (FIG. 6) having a series of holes 34 located at the corner of the mounting plate 30, which are configured to be attached with a series of bolts or anchors 32 to the underside of the flooring member 110. In an alternative embodiment, the mounting plate 30 can be a rectangular plate (FIG. 7) having a first width and a second width, wherein the first width is greater than the second width. As shown in FIG. 7, the mounting plate 30 also includes a plurality of mounting holes 34 and a plurality of stiffener plates 120, and more preferably in accordance with one embodiment at least 6 mounting holes and at least four (4) stiffener plates 120. The at least six (6) mounting holes include at least four (4) mounting holes at the corners of the mounting plate 30 and at least two (2) mounting holes located at an equal distance from the longer width of the rectangular plate.

Figure 8:
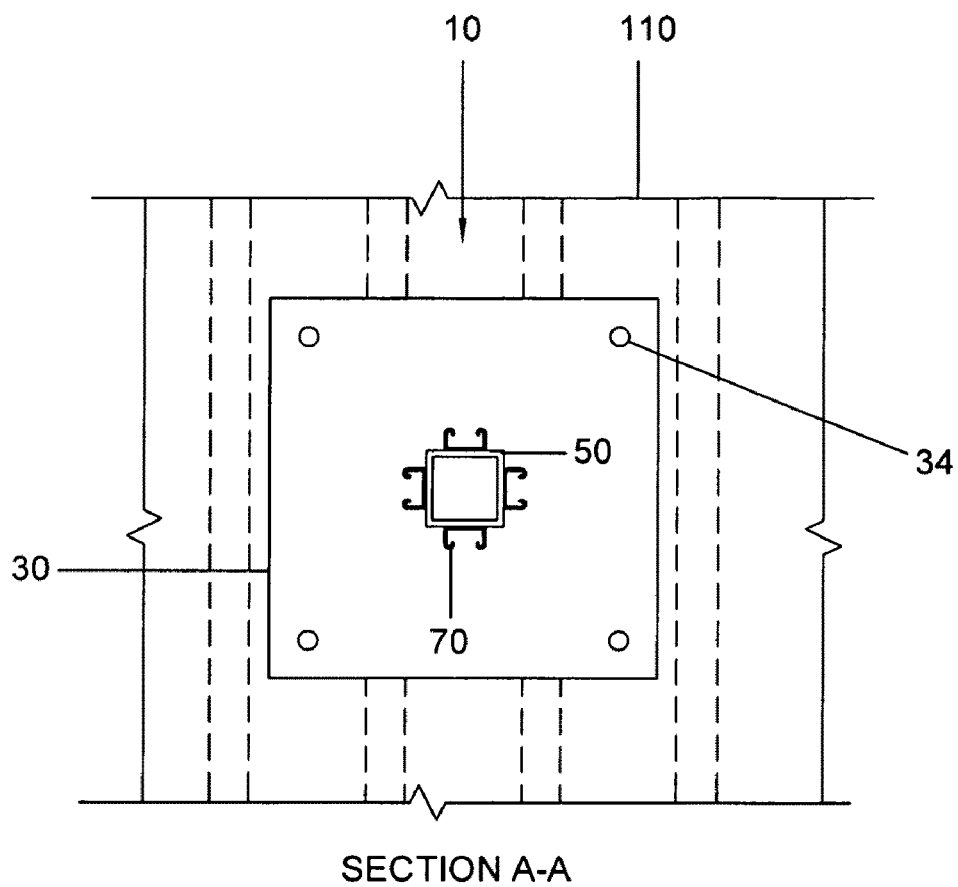
FIG. 8 is a plan view of an elongated support member and a mounting plate in accordance with an embodiment.

FIG. 8 is a plan view of the mounting plate 30, the elongated support member 50, and the elongated channel member 70 in accordance with an embodiment. As shown in FIG. 8, the elongated support member 50 is preferably a hollow tubular member having a polygonal cross-section, and more preferably a rectangular cross-section. The elongated channel member 70 has a substantially U-shaped cross-section and is adapted to receive a fastener 100 in the form of a bracket or clamp. In accordance with one embodiment, the channel members 70 are preferably welded to the elongated support member 50.

FIG. 9 is a schedule of different embodiments of bracing assembly 10 in accordance with an embodiment. As shown in FIG. 9, the schedule includes various embodiments of the mounting plate 30 with various embodiments of the number of bolts or anchors (i.e., bolts) 32 and with or without a stiffener plate 120, the sheathing member (i.e., sheathe) 40, the elongated support member (i.e., tube) 50 and channel members 70.

It can be appreciated that one advantage of the bracing assembly 10 as shown in FIGS. 3-8, is the ease of installation of the bracing assembly 10 and the piping or conduit 90 thereto. In accordance with one embodiment, a method of installation of the pipe bracing assembly 10 includes placing a template (not shown) in the shape of the mounting plate 30 on the underside of the structural flooring member 110 to mark the mounting holes. The mounting holes are preferably drilled and the bolts (or anchors) 32 are placed. If the installation of the assembly 10 is done during construction of the building, in accordance with one embodiment, the mounting plate 30 and the bolts (or anchors) 32 can be embed directly into the concrete of the flooring member 110 at the time the concrete of the flooring member is cast. If the installation is done as a retrofit after construction, the bolts (or anchors) 32 can be expansion anchors or adhesive anchors that are set into holes drilled into the hardened concrete. The mounting plate 30 is then raised into place and bolted tight. The elongated support member 50 is then attached to the mounting plate 30 with a high strength bolt and the installation is complete and ready for piping (and/or conduit 90).

It can be appreciated that in traditional bracing systems, acceptable locations for the vertical and two diagonal braces required for each pipe (and/or conduit) and obstructions if they exist, must be moved or the braces redesigned. It can be appreciated that such obstructions can cause considerable delay and increase costs. Accordingly, as a result of the efficiency of the bracing assembly 10, the bracing assembly 10 can save on both cost of materials and labor costs.

In addition, another advantage of the bracing assembly 10 as shown is the small footprint required for installation. It can be appreciated that the bracing assembly 10 can be installed with minimal intrusion above the ceiling space. In accordance with one embodiment, only a small area (approximately two feet square) directly above the systems to be braced is needed for access.

In traditional pipe bracing the diagonal members typically extend at a 45-degree angle from the pipe, up to the structural floor member. Therefore, if the pipe is five feet below the floor, the brace attachment to the floor might be five feet away from the pipe. This will typically require a much larger area of ceiling to be disturbed for access.

In accordance with another embodiment, a computerized database that records all bracing assemblies 10 used in a specific building application can be implemented. The database can contain a list of each bracing assembly 10, its size and capacity to resist gravity and earthquake forces, and the number, weight and location of each pipe or conduit attached to it. The database can also contain information on the seismicity of the building site. The function of the database would be to track how much of the capacity of each bracing assembly 10 is being utilized by the pipes or conduit that are currently attached to it, and also to assist the contractor and its engineer in both determining whether or not new pipes can be safely attached to an existing bracing assemblies 10 and how to select new bracing assemblies 10 where new pipe or conduit runs are being placed. In accordance with one embodiment, the database can be accessible to contractors and engineers either on a desktop computer or on a field computer such as a laptop, tablet personal computer or PDA (personal digital assistant).

Figure 10A:
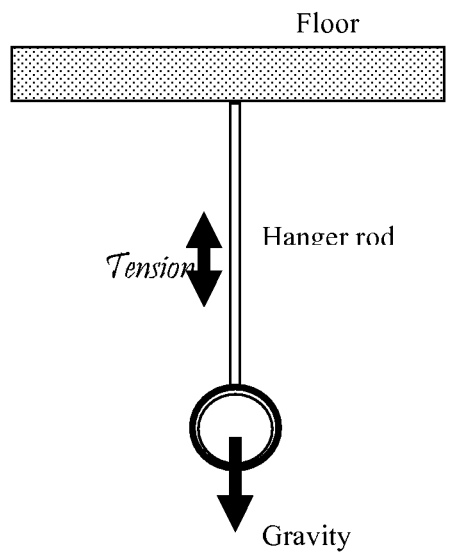
FIGS. 10A-10C are cross-sectional views of loading on a traditional pipe bracing as a result of gravity and/or an earthquake.
Figure 10B:
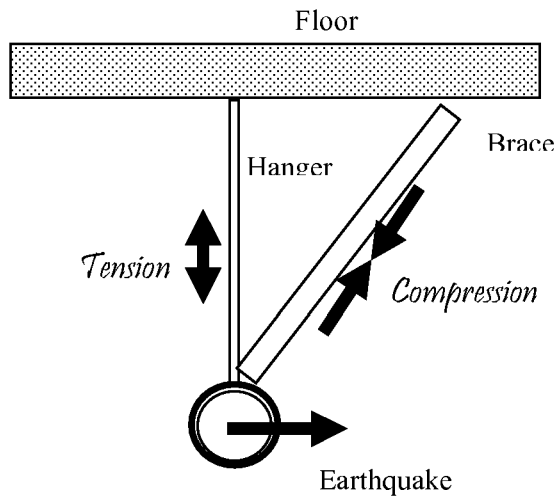

Traditional bracing consists of vertical rods that support pipes or conduit for gravity loads combined with diagonal bracing to resist lateral forces. As shown in FIG. 10A, gravity loads impart a tensile force on the hanging rod, which is transmitted into the floor framing above. Typically, the hanger consists of a small diameter rod or wire. Lateral forces are imparted horizontally, but are resisted by a brace, or braces, installed on a diagonal. The horizontal lateral force is resisted by an axial force, on the diagonal, in the brace, and by a vertical component, so that the sum of forces in each direction, horizontally and vertically, sum to zero. Depending on the direction of the earthquake force, the force in the diagonal can either be a tension or a compression, and the vertical component can either be "up" or "down." As shown in FIG. 10B, when the vertical component is "down" the force adds tension to the gravity load already in the hanger. At the same time, the force in the diagonal is compressive or tensile if two opposing braces are used.

Figure 10C:
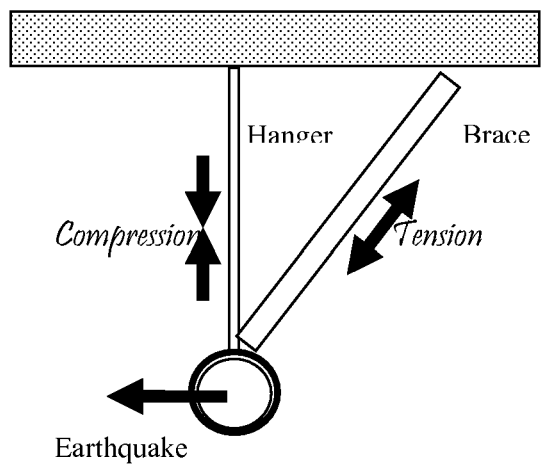

Alternatively, as shown in FIG. 10C, when the vertical component is "up" the force adds compression to the gravity load already in the hanger. At the same time, the force in the diagonal is tensile. Depending on the magnitude of the earthquake shaking intensity, the net force in the hanger may be compressive (FIG. 10B). In this case, the hanger must be supplemented by a stiff element that can resist compressive forces, such as a larger diameter rod or a small tube or pipe. Likewise, because the diagonal brace can be in compression during half the earthquake cycle, unless opposing braces are present, a single diagonal brace also needs to be stiff and able to resist compressive loading.

It can be appreciated that using engineering analysis it is a simple matter to confirm that the elements of a traditional bracing system combined act as a truss, in which each component acts only in tension or compression—that is, axially—but not in bending. This generally allows for elements to be smaller and more efficient than if they resisted not only axial loads but flexural loads as well.

Figure 11:
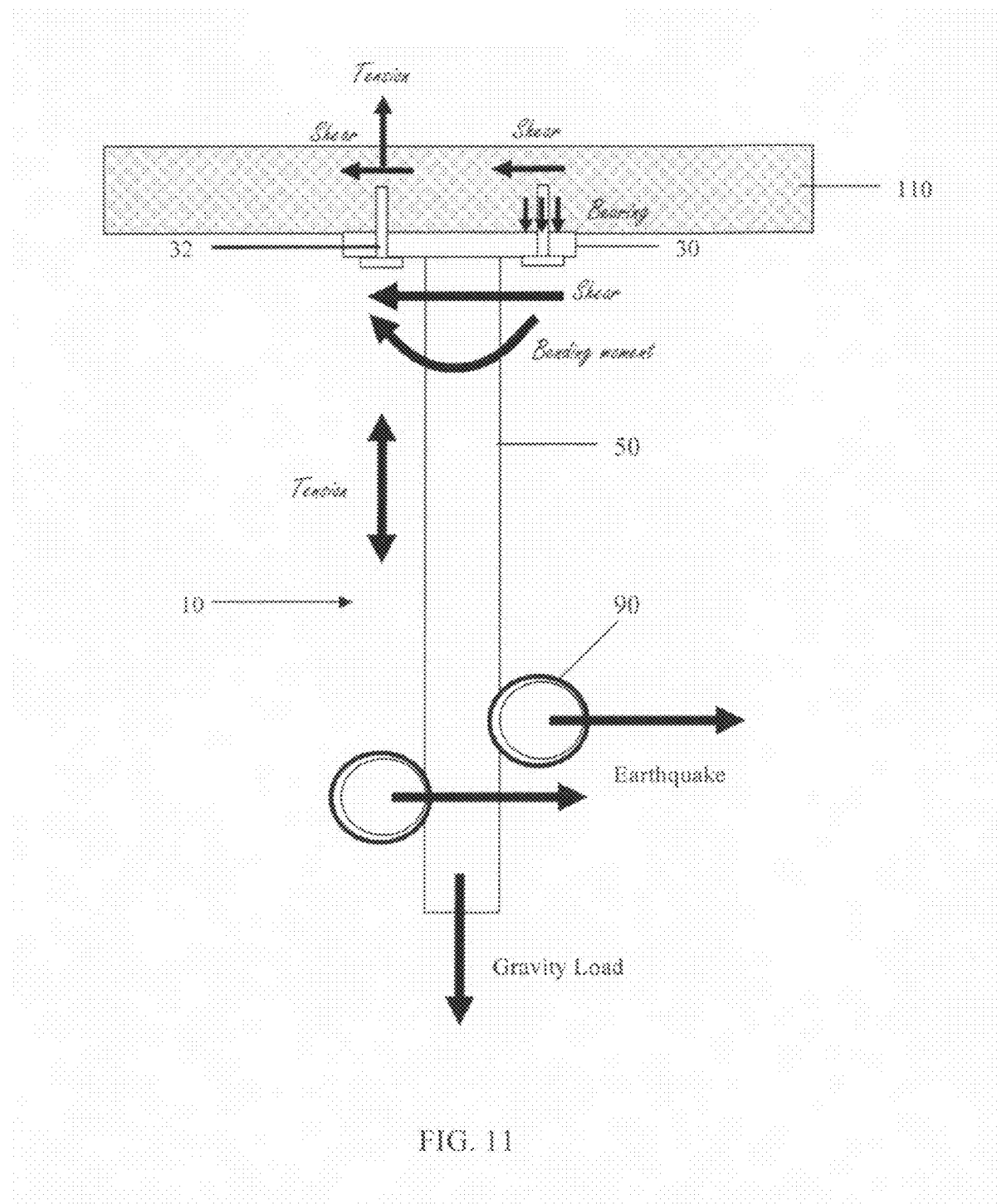
FIG. 11 is a cross-sectional view of loading on one embodiment of the pipe bracing assembly as a result of gravity and/or an earthquake.

It can be appreciated that the bracing assemblies 10 as shown in FIGS. 3-8 differs markedly from the traditional bracing method in that it uses a single element to resist tensile, compressive and flexural loading imparted by the pipes, conduits or ducts. As shown in FIG. 11, gravity loads are resisted by the elongated support member 50 (i.e., tube) and transmitted into the floor above through the anchors, fasteners or structural floor members. Horizontal loading in each direction is resisted by a horizontal shear in the support member 50 (tube) and by a bending moment imparted into the support member 50 (tube). The shear and bending moments are resisted by shear and tension in the anchors (i.e., bolts) and by bearing of the mounting plate 30 onto to the floor or structural flooring member above.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A bracing assembly comprising:
  a mounting plate attachable to an underside of a structural flooring member;
  an elongated support member attachable to the mounting plate and substantially rectangular in cross-section;
  at least one elongated channel member attachable to the elongated support member and configured to receive a fastener for attaching at least one pipe or conduit member to the at least one elongated channel member; and
  a sheathing member, the sheathing member being substantially rectangular in cross-section and adapted to attach the elongated support member to the mounting plate,
  wherein the bracing assembly is suspended from the structural flooring member when attached thereto.

2. The assembly of claim 1, wherein the at least one elongated channel member is welded to the elongated support member.

3. The assembly of claim 1, wherein the mounting plate is a rectangular steel plate.

4. The assembly of claim 1, wherein the elongated support member is inserted inside the sheathing member and the support member and the sheathing member are coupled with one or more fasteners or weldments.

5. The assembly of claim 1, wherein the mounting plate is bolted to the underside of the structural flooring member.

6. The assembly of claim 1, wherein the structural flooring member is a metal deck with a concrete topping, a concrete flat slab, a concrete waffle slab or a concrete beam.

7. The assembly of claim 1, wherein the mounting plate is welded or fastened to a bottom flange of a steel beam.

8. The assembly of claim 1, wherein the elongated support member has a length of about 2 to 8 feet and a width of about 2 to 12 inches.

9. The assembly of claim 1, wherein the at least one elongated channel member extends from an upper portion of the elongated support member to a bottom portion of the elongated support member.

10. The assembly of claim 1, further comprising a plurality of colored bands on the elongated support member that provide guidance for positioning the at least one pipe or conduit member on the elongated support member.

11. A system for bracing pipes comprising:
  a plurality of bracing assemblies, each having a mounting plate attachable to an underside of a structural flooring member, an elongated support member attachable to the mounting plate and substantially rectangular in cross-section, at least one elongated channel member attachable to the elongated support member, a fastener for attaching at least one pipe to the at least one elongated channel member and a sheathing member, the sheathing member being substantially rectangular in cross-section and adapted to attach the elongated support member to the mounting plate, wherein each bracing assembly is suspended from the structural flooring member when attached thereto;
  and
  a plurality of pipes each of which are attached to at least one bracing assembly.

12. The system of claim 11, wherein at least one of the bracing assemblies further includes a plurality of colored bands on the elongated support member that provide guidance for positioning the at least one pipe on the elongated support member.

13. The system of claim 11, wherein the at least one pipe and plurality of pipes includes pipes, ductwork and/or conduit members.

14. A method for bracing a plurality of pipes and conduit, the method comprising:
  attaching a bracing assembly to an underside of a structural flooring member, the bracing assembly comprising:
    a mounting plate attachable to the underside of the structural flooring member;
    an elongated support member attachable to the mounting plate and substantially rectangular in cross-section;
    at least one elongated channel member attachable to the elongated support member and configured to receive a fastener for attaching at least one pipe or conduit member to the at least one elongated channel member; and
    a sheathing member, the sheathing member being substantially rectangular in cross-section and adapted to attach the elongated support member to the mounting plate,
    wherein the bracing assembly is suspended from the structural flooring member when attached thereto,
    and attaching at least one pipe or conduit with a fastener to the at least one elongated channel member.

15. The method of claim 14, further comprising welding the sheathing member to the mounting plate and attaching the elongated support member to the sheathing plate.

16. The method of claim 14, further comprising a plurality of colored bands along the elongated support member, wherein the colored bands provide guidance for installation of the at least one pipe or conduit along the elongated support member.

17. The method of claim 14, wherein the at least one pipe or conduit includes a plurality of pipes, ductwork and/or conduits.

* * * * *